March 11, 1958     E. G. BUEHLER     2,826,484
PLASTIC INFUSOR FLOAT
Filed March 27, 1957

INVENTOR
EDWARD G. BUEHLER

BY
ATTORNEY

United States Patent Office 2,826,484
Patented Mar. 11, 1958

2,826,484
PLASTIC INFUSOR FLOAT

Edward G. Buehler, Honolulu, Territory of Hawaii

Application March 27, 1957, Serial No. 648,818

1 Claim. (Cl. 23—267)

This invention relates to infusors and, more particularly, to a device for treating swimming pool water with chlorine.

The primary object of the invention is to provide a plastic float having a perforate container within which chlorine crystals or tablets may be confined so that, when the float is tethered in a swimming pool, the chlorine will slowly dissolve into the surrounding water.

Among the specific objects are the provision of a hollow ellipsoidal container formed of separable top and bottom sections, wherein the top section constitutes a float bell, the bottom section being the chlorine receptacle. It is further intended that the top and bottom sections be readily separable, so that the supply of chlorine may be easily replenished, and that they be easily joinable by a tight locking arrangement so that the bottom section cannot be accidently dislodged. In the top section, it is intended to inset a tether-string attachment, the bottom section being weighted so that the assembled device will float upright.

Another feature of the device is that it be moldable of plastic, and has comparatively thin walls in most regions, great strength being provided by semi-spherical contours for the bottom and top sections. At its mid portion, where the bottom and top sections are joined, and where maximum strength is needed, there is provided an inwardly thickened belt for withstanding inwardly exerted compressional forces, and providing also for a strong joint between the upper and lower sections.

These and other objects will be apparent from the following specification and drawing, in which.

Figure 1:
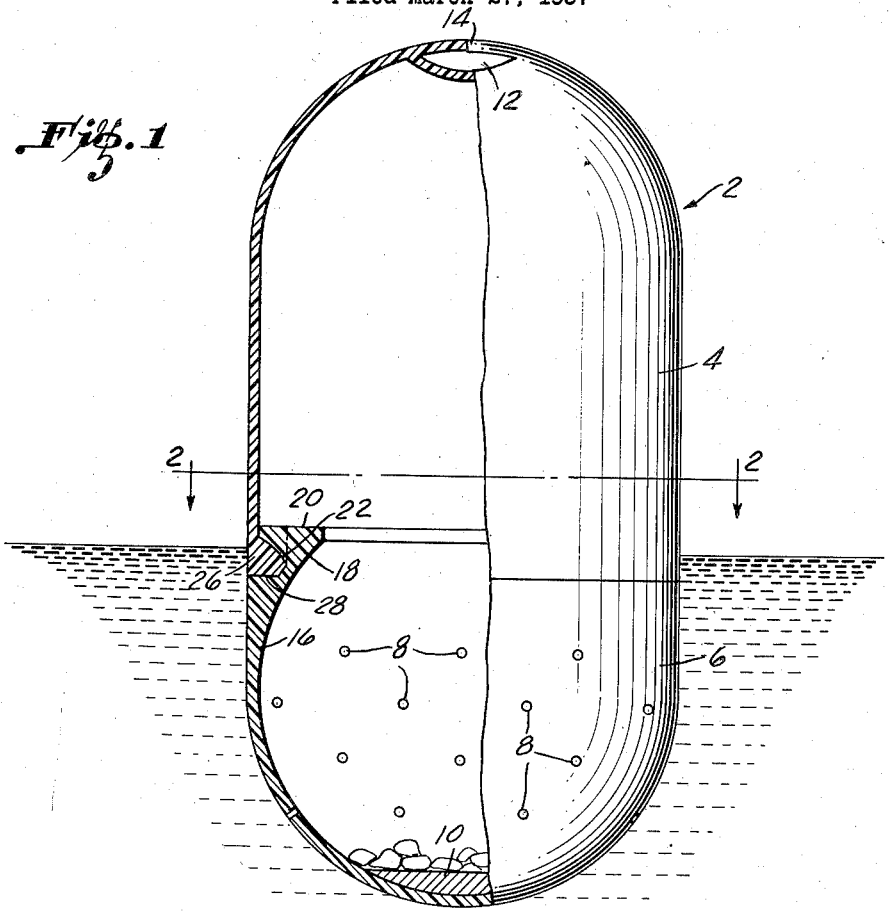
Fig. 1 is an elevation of the float partly broken away.
Figure 2:
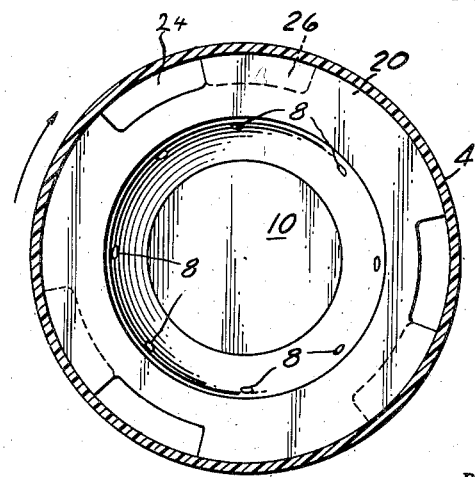
Fig. 2 is a horizontal section along the line 2—2 of Fig. 1.

Referring now to the drawing in which like reference numerals denote similar elements, the float 2, preferably of molded plastic material, is of hollow ellipsoidal shape, longer in its normally vertical dimension, and comprised of separable top and bottom sections 4 and 6 respectively. Perforations 8 are distributed about the bottom section to permit the slow ingress and egress of water. While no water is shown within the device in the drawing, it will be understood that, soon after being set afloat, water will seep through perforations 8. A ballast weight 10 is affixed in the lower end of the bottom section so that the float will be maintained upright in the water. At the middle of its top, upper section 4 is formed with an indentation 12 bridged by a tether-string attachment strip 14. It will be apparent to those skilled in the art that, when bottom section 6 is filled with chlorine crystals or tablets, a few such crystals being illustrated, float 2 may be tethered by a suitable string in a swimming pool. The water passing inwardly and outwardly through perforations 8 will slowly dissolve the tablets or crystals and thus sterilize the surrounding water. The air trapped in the bell-like upper portion 4 will maintain the desired buoyancy, and the vertically elongate ellipsoidal shape of the float will cause it to bob and tip constantly with the slightest surface rippling of the pool.

Referring particularly to the middle regions of the float and the inner side of bottom section 6, it will be seen that the latter is thickened in the region above reference numeral 16 as a result of spherically contoured inner wall 18, whereas the outer surface of the upper portion of the bottom section is cylindrical. This results in a thickened belt 20, the latter having a circumferential groove 22 and angularly spaced cutouts 24 in the belt above the groove. Inwardly extending lugs 26 on the lower edge portion 28 of upper section 4 are spaced to engage through the cutouts 24 in the lower section and to lock beneath the solid portions 30 of thickened belt 20 when the upper and lower sections 6 and 8 are twisted with respect to one another. Thus, when it is necessary to replenish the supply of chlorine, top and bottom sections 4 and 6 may be easily separated after reversely twisting them so as to bring lugs 26 in registry with cutouts 24.

The spherical characteristics of the inner wall 6 and the thickened belt 20 provide an extremely strong structure which militates against distortion or cracking at any point and particularly in the region of the juncture with the upper section.

The invention is not limited to the details disclosed and described herein but is intended to cover all substitutes, modifications and equivalents within the scope of the following claim.

I claim:

An infusor, comprising a generally thin-walled hollow plastic body of ellipsoidal configuration elongate in its normally upright position, said body being formed of separable upper and lower sections, said upper section being imperforate and constituting a buoyant bell, said lower section being perforate and constituting a container for antiseptic material to be infused in liquid surrounding the float, ballast affixed in said lower section for maintaining the infusor in generally upright position, a tether-string attachment on the upper section of the body, and a separable joint connecting said upper and lower sections, the outer surface of the wall of said lower section being generally semi-spherical at its lower end and cylindrical at its upper end, the inner surface of the wall of said lower section being generally semi-spherical throughout, there being an inwardly thickened belt at the upper end of said lower section in the region of the joint, said joint being of the overlapping lug type and constituted by an annular groove in the outer periphery of the belt, the belt having a ledge above the groove and angularly spaced cutouts in the ledge, said upper section having a lower edge portion engaging the ledge, and inwardly extending lugs on said lower edge portion, said lugs engaging through said cutouts and thereafter locking beneath said ledge upon twisting of said sections with respect to one another, the outer surfaces of the contiguous portions of the upper and lower sections being smooth and flush with one another.

References Cited in the file of this patent

UNITED STATES PATENTS

| | | |
|---|---|---|
| 1,771,519 | Allen | July 29, 1930 |
| 2,148,180 | Teigen | Feb. 21, 1939 |
| 2,501,260 | Brodin | Mar. 21, 1950 |